(12) United States Patent
Wobben

(10) Patent No.: US 7,096,639 B2
(45) Date of Patent: Aug. 29, 2006

(54) CONNECTING FLANGE FOR TUBULAR COMPONENTS AND WIND TURBINE TOWER EMPLOYING SAME

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 10/471,684

(22) PCT Filed: Mar. 16, 2002

(86) PCT No.: PCT/EP02/02931

§ 371 (c)(1),
(2), (4) Date: Jan. 20, 2004

(87) PCT Pub. No.: WO02/077397

PCT Pub. Date: Oct. 3, 2002

(65) Prior Publication Data

US 2004/0112002 A1    Jun. 17, 2004

(30) Foreign Application Priority Data

Mar. 23, 2001 (DE) ............................... 101 14 431
May 29, 2001 (DE) ............................... 101 26 049

(51) Int. Cl.
   *E04C 3/30* (2006.01)
(52) U.S. Cl. ............... 52/726.4; 52/40; 52/741.15; 52/301
(58) Field of Classification Search ............... 52/40, 52/514, 726, 298, 726.4, 741.15, 297, 301, 52/223.5, 721.4, 726.3; 403/302, 305, 306, 403/312; 248/357, 188.2
See application file for complete search history.

(56) References Cited

U.S. PATENT DOCUMENTS

| 1,073,614 A | * | 9/1913 | McDearmid ............... 405/251 |
| 3,369,331 A | * | 2/1968 | Donald et al. ............... 52/38 |
| 3,421,781 A | * | 1/1969 | Spurk ............... 285/148.22 |
| 3,606,409 A | * | 9/1971 | Hawkins ............... 403/301 |
| 3,785,107 A | * | 1/1974 | Garretson ............... 52/514 |
| 3,839,835 A | * | 10/1974 | Meyer ............... 52/296 |
| 3,911,548 A | * | 10/1975 | Perry ............... 29/402.12 |

(Continued)

FOREIGN PATENT DOCUMENTS

DE    30 30 789    3/1982

(Continued)

Primary Examiner—Carl D. Friedman
Assistant Examiner—Chi Q. Nguyen
(74) Attorney, Agent, or Firm—Neil A. Steinberg; Mark Steinberg

(57) ABSTRACT

The present invention relates to an annular flange connection for attachment to one end of a tubular component. An object of one aspect of the invention is to provide an annular flange that is less prone to damage resulting from the stresses associated with the intended use. In one embodiment, an annular flange connection with a tubular portion for attachment to one end of a tubular component, in particular to a tower segment for assembling a wind turbine tower, and with a flange collar radially adjoining one end of said tubular portion, with a flange surface facing axially away from said tubular portion, the outer wall of the tubular portion being conical, in particular for attachment to an equally conical component.

21 Claims, 1 Drawing Sheet

U.S. PATENT DOCUMENTS

| | | | | |
|---|---|---|---|---|
| 3,942,296 A | * | 3/1976 | Meyer | 52/296 |
| 4,066,372 A | * | 1/1978 | Swanson et al. | 403/302 |
| 4,092,079 A | * | 5/1978 | Swanson | 403/306 |
| 4,272,929 A | * | 6/1981 | Hanson | 52/40 |
| 4,388,787 A | * | 6/1983 | Milbright | 52/298 |
| 5,333,436 A | * | 8/1994 | Noble | 52/726.3 |
| 5,632,651 A | * | 5/1997 | Szegda | 439/578 |
| 5,687,537 A | * | 11/1997 | Noble | 52/726.3 |
| 5,784,851 A | * | 7/1998 | Waugh | 52/736.1 |
| 5,964,260 A | * | 10/1999 | Chudy | 141/319 |
| 6,513,291 B1 | * | 2/2003 | Gilsdorf | 52/297 |

FOREIGN PATENT DOCUMENTS

| | | |
|---|---|---|
| DE | 39 26 778 | 4/1990 |
| DE | 197 41 988 | 4/1999 |
| DE | 201 00 511 U1 | 9/2001 |
| FR | 2 749 342 | 12/1997 |
| FR | 2749342 A1 * | 12/1997 |
| FR | 2 750 460 | 1/1998 |
| RO | 108816 | 8/1994 |
| WO | WO 02/38890 | 5/2002 |
| WO | WO 02/38891 | 5/2002 |

* cited by examiner

CONNECTING FLANGE FOR TUBULAR COMPONENTS AND WIND TURBINE TOWER EMPLOYING SAME

RELATED INFORMATION

The present invention relates to an annular flange connection for attachment to one end of a tubular component.

Annular flange connections for connecting tubular components are known, for example from Dieter Lehmann, "Berechnung von L-Flaschen mit unterschiedlichen Kontaktflächen/Ringflanschformen nach DIN 4133", Ernst & Sohn, *Stahlbau* 69 (2000) Issue no. 9, pp. 682–687, and such annular flange connections are also widespread in use. In the field of pipeline construction, for example, flange collars are known which radially adjoin the tubular component, said flange collars usually projecting radially outwards at the ends of the pipe section. These flange collars usually have a planar-flange surface facing axially away from the actual pipe member, and have through bores distributed around their circumference. By this means, the tubular components can be aligned with each other, for example as segments of a pipeline, and bolted together with the help of suitable seals to form a pipeline.

Due to the fact that these annular flange collars project laterally from the body of the actual tubular component, it is generally disadvantageous for production to manufacture the flange collars as an integral part of the tubular components (at least whenever the component cannot be made by casting)—e.g. Aa tubular component made by welding together metal plates or sheet steel is generally very difficult to preform as a semifinished product such that a flange collar can be formed by suitable bending, for example. For this reason also, it has become standard practice to manufacture tubular components without a flange collar at first, and then to attach a flange collar to the actual component using a suitable joining technique—for example, in the case of metal pipes, by welding, or, in the case of plastic pipes, by bonding or laminating.

In order to improve the transmission of force into the potentially highly stressed area of the annular flange, it has proved beneficial from the constructional perspective, as is known, to preform an annular flange element in such a way that it has a short, cylindrical tubular portion for attachment to one end of a cylindrical tubular component, one end said of said portion being welded, for example, to the cylindrical tubular component and the other end continuing as a radially adjoining flange collar with a flange surface projecting axially away from the cylindrical tubular portion.

In the construction of wind turbine towers, for example, tubular tower segments are stacked one on top of the other at the assembly site in order to achieve great heights. For statics reasons, it is proven practice also in this field of technology to make the tower taper conically upwards from the portion close to the ground to the gondola. Until now, cracks and other manifestations of fatigue have occurred in flange connections used to connect the segments of a tower.

SUMMARY OF THE INVENTION

An object of one aspect of the invention, in contrast, is to provide an annular flange that is less prone to damage resulting from the stresses associated with its intended use.

With regard to wind turbine towers, it makes constructional sense to exploit every opportunity to optimize the flow of forces through flange connections between tower segments. Attaching notorious annular flange elements, with straight cylindrical attachment portions aligned in the direction of the cylinder axis, to conically tubular tower components, in the manner intended by the prior art, results in a flow of forces in the flange connection that may even exhibit multiple changes of direction, and is also aesthetically disadvantageous.

In one aspect of the present invention, in contrast, an annular flange has a tubular portion for attaching the flange to one end of a tubular component. A flange collar radially adjoins one end of said portion, preferably inwards, and the flange has a preferably planar flange surface facing axially away from said portion. The outer wall of the tubular portion is conical and can therefore be attached to a conically tubular component to produce a contiguous outer contour. This significantly improves the flow of forces from the conically tubular component into the flange collar, because a deflection of the flow of forces—which generally causes a concentration of stresses and possibly over—stressing of components—is thus prevented.

The flange collar adjoins the tubular portion, preferably radially inwards, so that, when using the flange according to one aspect of the invention to connect tower segments of a wind turbine, for example, the flange collar—as well as other connection elements such as flange connecting screws, which produce connecting force and positive locking by means of through bores arranged axially on the circumference—are positioned inside the tower, and thus protected against weathering.

The tubular portion and the radial flange collars of the flange connection according to one aspect of the invention are preferably made as a seamless, integral part. The flange connection according to one aspect of the invention is preferably turned as a single piece from a metal semifinished product, or wound as a single component, e.g. as prepreg, when made from a fiber composite material. Casting as an integral part is also in accordance with one aspect of the invention, however.

In order to be able to produce a connection between two tubular components with the flange of one aspect of the invention and with the advantageous contiguous outer contour according to one aspect of the invention, two flanges according to one aspect of the invention are preferably matched to produce such a connection, in such a way that the (conical) outer walls of the tubular portions of the two flanges are contiguous with each other when the two flanges are connected with their flange surfaces lying one upon the other—for example by bolting them together by means of the axial through bores in their flange collars, which are then aligned with each other, preferably in pairs.

In order to optimize further the flow of forces through the preferably planar flange surface and through a connecting screw in the preferred through bore, said through bore is preferably surrounded by a recess in the flange surface. Owing to greater length of expansion, this has a favorable effect on the load imposed on the connecting screw in the through bore, and favorably displaces the zone of contact of one flange surface with a complementary flange surface around the through bore into the radially outer and inner edges of the flange surface.

DETAILED DESCRIPTION

Figure 1:
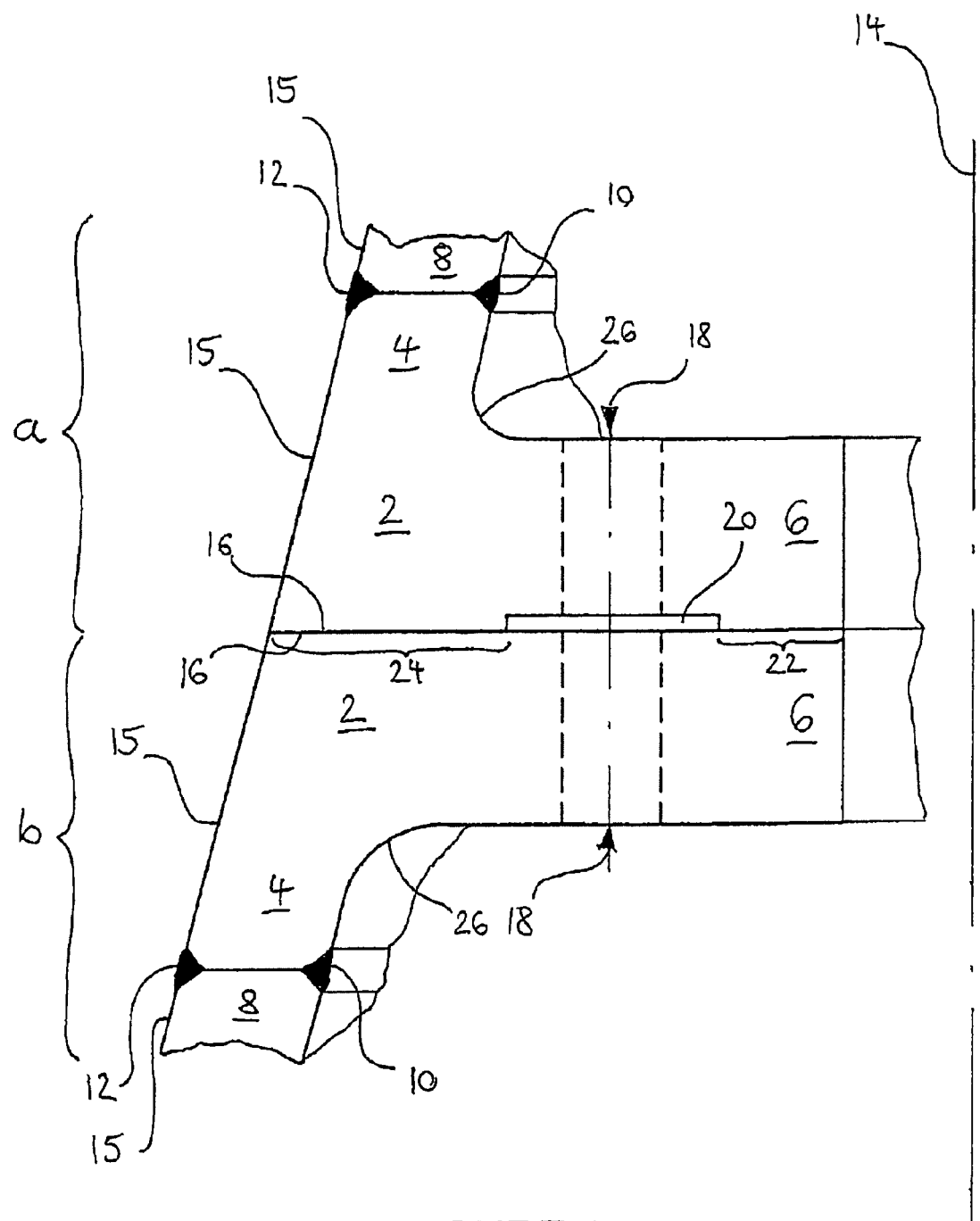
FIG. 1 shows a cross-section through a flange connection according to one embodiment of aspects of the invention.

Aspects of invention will now be described with reference to the enclosed drawing.

FIG. 1 shows a cross-section through a flange connection according to one embodiment of aspects of the invention, comprising two flanges that are each attached to a conically tubular component.

The flange connection shown in FIG. 1 is formed by two flanges 2 (whereby, when differentiation is necessary, the upper components and elements, in other words those associated with the upper of the two flanges 2 shown in the drawing, are referred to as 'a' and the lower ones as 'b'). Both flanges 2 have a tubular portion 4 and a flange collar 6 that adjoins one end of the tubular portion 4 radially inwards. A tubular component 8 adjoins the other end of each tubular portion 4 and is welded to the annular flange connection 2 by means of a radially inner and a radially outer weld seam 10, 12. Flanges 2 are made of welding steel.

The arrangement in FIG. 1 thus described is configured overall as a ring or pipe about a rotational axis 14, whereby the spacing—meaning the radius of the overall arrangement—is not shown to scale.

The outer wall (15) of the tubular portions 4 of flanges 2, as well as the tubular components 8, are on the whole conical in shape, and their outer walls (15) are contiguous—forming a straight line in the example shown.

The two flanges 2 each have a planar flange surface 16 facing axially away from their respective tubular portions 4, said surfaces being of equal size—i.e. with an identical inner and outer diameter—and lying congruently one upon the other. Facing each other in this way, flanges 2 have through bores 18 distributed uniformly around their circumference, said through bores extending axially through the respective flange collar 6 and positioned in alignment with each other. To generate connecting force and positive locking for the flange connection of flanges 2, known screw fittings can be inserted in through bores 18. In order to optimize the flow of forces through the flange connection 2, through bores 18 are positioned radially as close as possible to the tubular portion 4, although this is constructionally limited, in particular by the accessibility of through bores 18 for tools that are used to fasten connecting screws, for example.

The flange collar 6a of only one of the flanges 2a of the flange connection (the upper flange in the drawing) has a recess 20 in its flange surface 16a, where it surrounds the through bore 18a. the two flanges 2 are now braced against each other by a flange connecting screw (not shown) extending through bores 18, the area of force transfer or flow of force through flange surfaces 16 is displaced radially outwards from through bores 18 into a radially inward area 22 and a radially outward area 24 of flange surfaces 16. Load transmission in the radially outward area 24, in particular, is favorable with respect to structural mechanics, because this brings about a straight-line, deflection-free flow of force from the upper conical tubular component 8a through the conical tubular portion of the upper flange 2a into the conical tubular portion 4b of the lower flange 2b, and ultimately into the lower conical tubular component 8b; this means, in other words, that there is a flow of forces without any deflections that would be unfavorable for the structural mechanics. In order to further enhance the flow of forces, the outer peripheral area 24 of flange surface 16 is preferably wider than the thickness of the wall of tubular portion 4 and/or of component 8, so that the flow of forces is not restricted in this area, either.

In order to enhance still further the flow of forces through flange 2, the transition from the substantially axial extension of the tubular portion 4 to the radial extension of the flange collars 6 is not sharp, but configured instead as a radius 26. This prevents detrimental stress maxima and notch effects.

The invention claimed is:

1. A wind turbine tower comprising:
 a first tower segment including a tubular component having a conical outer wall; and
 a first flange including a tubular portion and a flange collar, the tubular portion being attached to an end of the tubular component and having a conical outer wall contiguous with the conical outer wall of the tubular component, the flange collar adjoining one end of the tubular portion and having a flange surface facing axially away from the tubular portion.

2. The wind turbine tower of claim 1 wherein the outer wall of the tubular portion and the outer wall of the tubular component are equally conical.

3. The wind turbine tower of claim 1 wherein the tubular portion has a radially outer portion attached to a radially outer portion of the tubular component.

4. The wind turbine tower of claim 1 wherein the flange collar adjoins a radially inner side of the end of the tubular portion.

5. The wind turbine tower of claim 1 wherein the flange surface is planar.

6. The wind turbine tower of claim 1 wherein the flange collar has at least one axial through bore for a flange connecting screw.

7. The wind turbine tower of claim 6 wherein the flange collar has a recess in the flange surface around the through bore.

8. The wind turbine tower of claim 7 wherein a smallest spacing between the recess and an edge of the flange surface to which a wall of the tubular portion adjoins is greater than the wall thickness of the tubular portion.

9. The wind turbine tower of claim 1 wherein the tubular portion and the flange collar are manufactured as a seamless, integral part.

10. The wind turbine tower of claim 1 wherein the tubular portion is welded to the end of the tubular component.

11. The wind turbine tower of claim 1 further comprising a second flange that includes a tubular portion and a flange collar adjoining one end of the tubular portion, the tubular portion of the second flange having a conical outer wall, the flange collar of the second flange having a flange surface facing axially away from the tubular portion of the second flange, wherein the flange surface of the first flange and the flange surface of the second flange are disposed one upon the other and the tubular portion of the first flange and the tubular portion of the second flange are conically contiguous with each other.

12. The wind turbine tower of claim 11 further comprising a second tower segment including a tubular component having a conical outer wall, the tubular portion of the second flange being attached to an end of the tubular component of the second tower segment.

13. The wind turbine tower of claim 1 wherein the tubular portion has a radially outer portion attached to a radially outer portion of the tubular component.

14. The wind turbine tower of claim 7 wherein the recess is radially spaced from the outer wall of the tubular portion by a distance that is greater than a radial thickness of the tubular portion.

15. The wind turbine tower of claim 1 wherein the conical outer wall of the tubular portion and the conical outer wall of the tubular component are conically contiguous with each other.

16. A wind turbine tower comprising: a flange for use in association with a tubular component of the wind turbine tower, the tubular component having a conical outer wall, the flange comprising:
   a tubular portion for attachment to an end of the tubular component of the wind tower turbine, the tubular portion having a conical outer wall which is contiguous with the conical outer wall of the tubular component, and
   a flange collar adjoining one end of the tubular portion, the flange collar having a flange surface facing axially away from the tubular portion, the flange collar having at least one axial through bore and a recess in the flange surface around the through bore.

17. The wind turbine tower of claim 16 wherein the tubular portion and the manufactured as flange collar are manufactured as a seamless, integral part.

18. The wind turbine tower of claim 16 wherein the recess is radially spaced from the outer wall of the tubular portion by a distance that is greater than a radial thickness of the tubular portion.

19. The wind turbine tower of claim 16 wherein the flange collar adjoins a radially inner side of the end of the tubular portion.

20. A method for use in manufacturing a wind turbine tower, the wind turbine tower including a tower segment that includes a tubular component having a conical outer wall, the method comprising:
   providing a flange that includes a tubular portion and a flange collar, the tubular portion having a conical outer wall contiguous with the conical outer wall of the tubular component, the flange collar adjoining one end of the tubular portion and having a flange surface facing axially away from the tubular portion; and
   attaching the tubular portion of the flange to an end of the tubular component of the tower segment.

21. The method of claim 20 wherein attaching the tubular portion of the flange to an end of the tubular component of the tower segment comprises welding the tubular portion of the flange to the tubular component of the tower segment.

* * * * *

UNITED STATES PATENT AND TRADEMARK OFFICE
CERTIFICATE OF CORRECTION

PATENT NO. : 7,096,639 B2  Page 1 of 1
APPLICATION NO. : 10/471684
DATED : August 29, 2006
INVENTOR(S) : Wobben It is certified that error appears in the above-identified patent and that said Letters Patent is hereby corrected as shown below:

In col. 5, on line 20, delete "manufactured as".

In col. 5, on line 21, delete "manufactured as".

Signed and Sealed this

Sixteenth Day of October, 2007

JON W. DUDAS
*Director of the United States Patent and Trademark Office*